US011502604B2

(12) United States Patent
Tseng et al.

(10) Patent No.: US 11,502,604 B2
(45) Date of Patent: Nov. 15, 2022

(54) BANG-BANG FLYING CAPACITOR VOLTAGE BALANCE FOR BUCK CONVERTER

(71) Applicant: MEDIATEK INC., Hsin-Chu (TW)

(72) Inventors: Chun-Yen Tseng, Hsinchu (TW); Hao-Ping Hong, San Jose, CA (US); Chih-Wei Lin, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 9 days.

(21) Appl. No.: 17/079,517

(22) Filed: Oct. 25, 2020

(65) Prior Publication Data

US 2021/0159790 A1 May 27, 2021

Related U.S. Application Data

(60) Provisional application No. 62/939,011, filed on Nov. 22, 2019.

(51) Int. Cl.
*H02M 3/158* (2006.01)
*H02M 1/08* (2006.01)

(52) U.S. Cl.
CPC ............. *H02M 3/158* (2013.01); *H02M 1/08* (2013.01)

(58) Field of Classification Search
CPC .......... H02M 1/08; H02M 1/088; H02M 3/06; H02M 3/07; H02M 3/135; H02M 3/158
See application file for complete search history.

(56) References Cited

U.S. PATENT DOCUMENTS 9,929,653 B1 * 3/2018 Mercer ............... H02M 7/4837
10,355,591 B2 7/2019 Granato
(Continued)

FOREIGN PATENT DOCUMENTS

CN 106797180 A 5/2017
CN 109787469 A 5/2019
(Continued)

OTHER PUBLICATIONS

Karasawa, "A 92.8% Efficiency Adaptive-On/Off-Time Control 3-Level Buck Converter for Wide Conversion Ratio with Shared Charge Pump Intermediate Voltage Regulator", 2018 Symposium on VLSI Circuits Digest of Technical Papers.
(Continued)

*Primary Examiner* — Matthew V Nguyen
(74) *Attorney, Agent, or Firm* — Winston Hsu

(57) ABSTRACT

A buck converter includes an output stage, a FCVB control circuit and a driver. The output stage includes a plurality of switches and a flying capacitor, wherein the switches are connected in series, the flying capacitor is coupled between two of the switches, and the output stage is configured to receive an input voltage to generate an output voltage. The FCVB control circuit is configured to compare a voltage of the flying capacitor with half of the input voltage to generate a comparison result, and the FCVB control circuit further responds to the comparison result to generate a first control signal and a second control signal based on a first PWM signal and a second PWM signal. The driver is configured to generate a plurality of diving signals according to the first control signal and the second control signal, wherein the driving signals are arranged to control the switches, respectively.

12 Claims, 7 Drawing Sheets

(56) References Cited

U.S. PATENT DOCUMENTS 10,468,978 B2 11/2019 Zhang
10,554,124 B1 * 2/2020 Mangudi ................. H02M 1/08
2014/0232364 A1 8/2014 Thomas
2017/0229967 A1 8/2017 Li
2018/0123451 A1 * 5/2018 Larsen .................... H02M 1/14
2018/0287479 A1 * 10/2018 Li ..................... H02M 3/33507
2019/0058385 A1 2/2019 Lazaro
2022/0029534 A1 * 1/2022 Chen ..................... H02M 3/073

FOREIGN PATENT DOCUMENTS

CN 107112892 B 9/2019
EP 2 903 126 A1 8/2015
EP 3484034 A1 * 5/2019 ............ H02J 7/0013
EP 2 903 126 B1 5/2020
KR 20090085037 * 8/2009 ............ H02M 3/158
TW 201909533 A 3/2019

OTHER PUBLICATIONS

Liu, "A 50MHz 5V 3W 90% Efficiency 3-Level Buck Converter with Real-Time Calibration and Wide Output Range for Fast-DVS in 65nm CMOS", 2016 Symposium on VLSI Circuits Digest of Technical Paper.

Schaef, "A 93.8% Peak Efficiency, 5V-Input, 10A Max ILOAD Flying Capacitor Multilevel Converter in 22nm CMOS Featuring Wide Output Voltage Range and Flying Capacitor Precharging", 2019 IEEE International Solid-State Circuits Conference.

Chu, "A Three-Level Single-Inductor Triple-Output Converter with an Adjustable Flying-Capacitor Technique for Low Output Ripple and Fast Transient Response", 2017 IEEE International Solid-State Circuits Conference.

* cited by examiner

BANG-BANG FLYING CAPACITOR VOLTAGE BALANCE FOR BUCK CONVERTER

CROSS REFERENCE TO RELATED APPLICATIONS

This application claims the priority of U.S. Provisional Application No. 62/939,011, filed on Nov. 22, 2019, which is included herein by reference in its entirety.

BACKGROUND

Compared to a general buck converter, a 3-level buck converter divides an input voltage by using a flying capacitor, and the 3-level buck converter has effective conversion ratio and lower switching loss. However, to maintain performance of the 3-level buck converter, the flying capacitor should be controlled to have a voltage that is half of an input voltage (i.e. voltage difference between two terminals of the flying capacitor is preferred to be half of the input voltage). This control mechanism of the flying capacitor comprises complicated gate driver, pre-charging circuit and monitoring circuit, causing difficulties in circuit design.

SUMMARY

It is therefore an objective of the present invention to provide a flying capacitor voltage balance control circuit, which uses a simple control mechanism to efficiently balance the voltage of the flying capacitor, to solve the above-mentioned problems.

According to one embodiment of the present invention, a buck converter comprises an output stage, a FCVB control circuit and a driver. The output stage comprises a plurality of switches and a flying capacitor, wherein the switches are connected in series, the flying capacitor is coupled between two of the switches, and the output stage is configured to receive an input voltage to generate an output voltage. The FCVB control circuit is configured to compare a voltage of the flying capacitor with half of the input voltage to generate a comparison result, and the FCVB control circuit further responds to the comparison result to generate a first control signal and a second control signal based on a first PWM signal and a second PWM signal. The driver is configured to generate a plurality of diving signals according to the first control signal and the second control signal, wherein the driving signals are arranged to control the switches, respectively.

According to another embodiment of the present invention, a control method of a buck converter is provided, wherein the buck converter comprises an output stage, the output stage comprises a plurality of switches and a flying capacitor, the switches are connected in series, the flying capacitor is coupled between two of the switches, and the output stage is configured to receive an input voltage to generate an output voltage; and the control method comprises the steps of: comparing a voltage of the flying capacitor with half of the input voltage to generate a comparison result; referring to the comparison result to generate a first control signal and a second control signal based on a first pulse-width modulation (PWM) signal and a second PWM signal; and generating a plurality of diving signals according to the first control signal and the second control signal to control the switches, respectively.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
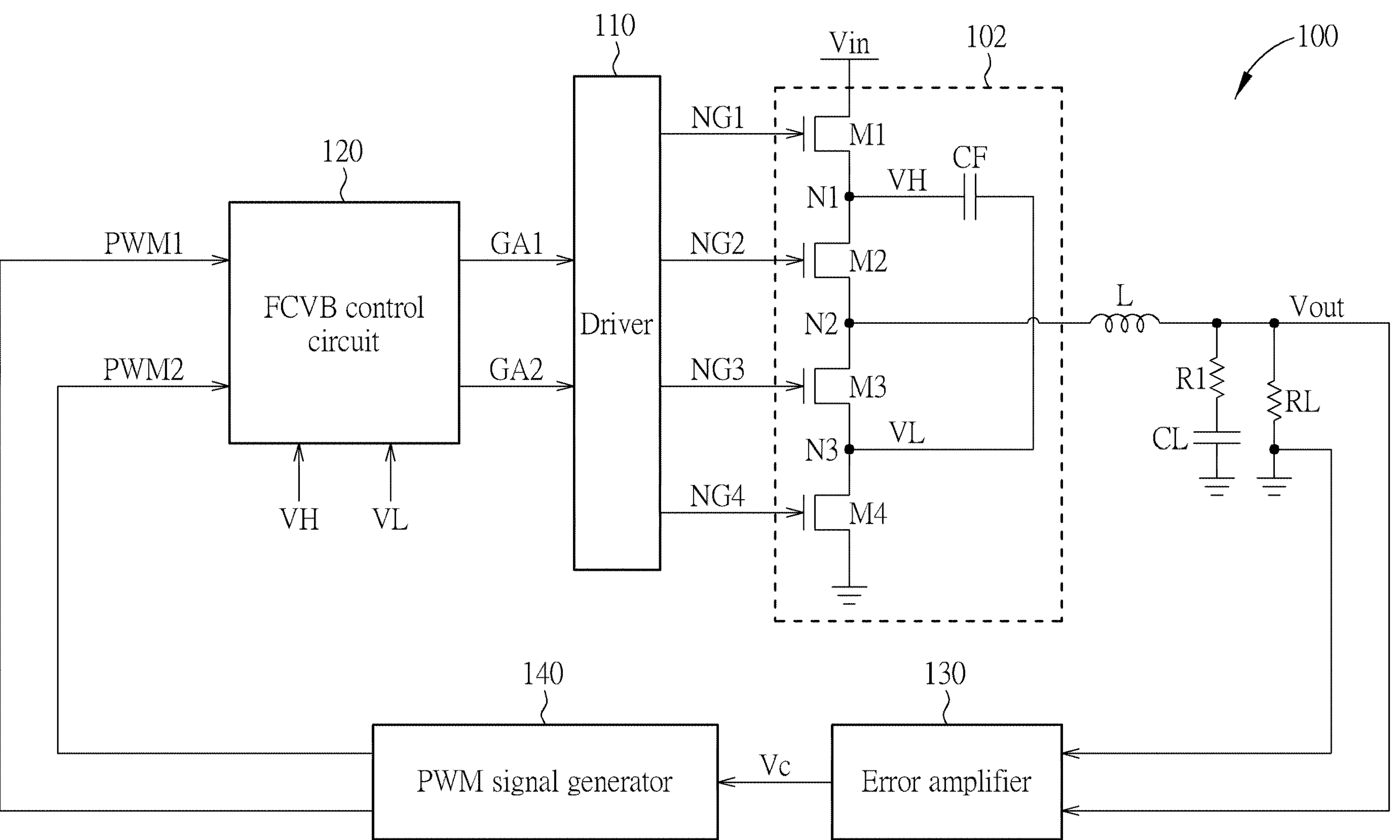
FIG. 1 is a diagram illustrating a buck converter according to one embodiment of the present invention.

FIG. 1 is a diagram illustrating a buck converter 100 according to one embodiment of the present invention, wherein the buck converter 100 is a 3-level buck converter. As shown in FIG. 1, the buck converter 100 comprises a driver 110, a flying capacitor voltage balance (FCVB) control circuit 120, an error amplifier 130, a pulse-width modulation (PWM) signal generator 140, an output stage 102 comprising four switches M1-M4 and a flying capacitor CF, an inductor L, a capacitor CL, a resistor R1 and a resistor RL. Regarding the output stage 102, each of the switches M1-M4 can be implemented by a P-type metal-oxide-semiconductor (PMOS), an N-type metal-oxide-semiconductor (NMOS) or any other suitable switch, and the switches M1-M4 are connected in series, wherein the switch M1 is coupled between an input voltage Vin and a node N1, the switch M2 is coupled between the node N1 and a node N2, the switch M3 is coupled between the node N2 and a node N3, and the switch M4 is coupled between the node N3 and the ground voltage. In addition, the flying capacitor CF is coupled between the nodes N2 and N3, that is one terminal of the flying capacitor CF is connected to the node N2, and the other terminal of the flying capacitor CF is connected to the node N3.

During operation of the buck converter 100, the voltage of the flying capacitor CF is required to be controlled to be "0.5*Vin" to make the buck converter 100 have better performance, that is a voltage difference between VH and VL is preferred to be "0.5*Vin" (i.e. VH−VL=0.5*Vin). Therefore, the error amplifier 130 is configured to compares the output voltage Vout with a reference voltage to generate a control signal Vc, and the PWM signal generator 140 responds to the control signal Vc to generate a first PWM signal PWM1 and a second PWM signal PWM2 having appropriate duty cycle, wherein the first PWM signal PWM1 and the second PWM signal are arranged to control different switches M1-M4. In addition, the FCVB control circuit 120 is configured to sample the voltage VL or the voltage VH to generate a first control signal GA1 and a second control signal GA2 according to the first PWM signal PWM1 and the second PWM signal PWM2. Specifically, based on the sampling result of the voltage VH/VL, the FCVB control circuit 120 can generate the control signals GA1 and GA2 based on the first PWM signal PWM1 and the second PWM signal PWM2, respectively, or the FCVB control circuit 120 executes a swapping mechanism to generate the control signals GA1 and GA2 based on the second PWM signal PWM2 and the first PWM signal PWM1, respectively. Then, the driver 110 generates driving signals NG1-NG4 based on the first control signal GA1 and the second control signal GA2. In this embodiment, the driver 110 generates the driving signals NG1 and NG4 based on the first control signal GA1 to control the switches SW1 and SW4 serving as a sub-buck-converter, and the driver 110 further generates the driving signals NG2 and NG3 based on the second control signal GA2 to control the switches SW2 and SW3 serving as another sub-buck-converter.

Because the buck converter 100 focuses on the FCVB control circuit 120, and the operations of the error amplifier 130 and the PWM signal generator 140 are well known by a person skilled in the art, the following description only describes the buck converter 100, the driver 110 and the output stage.

Figure 2:
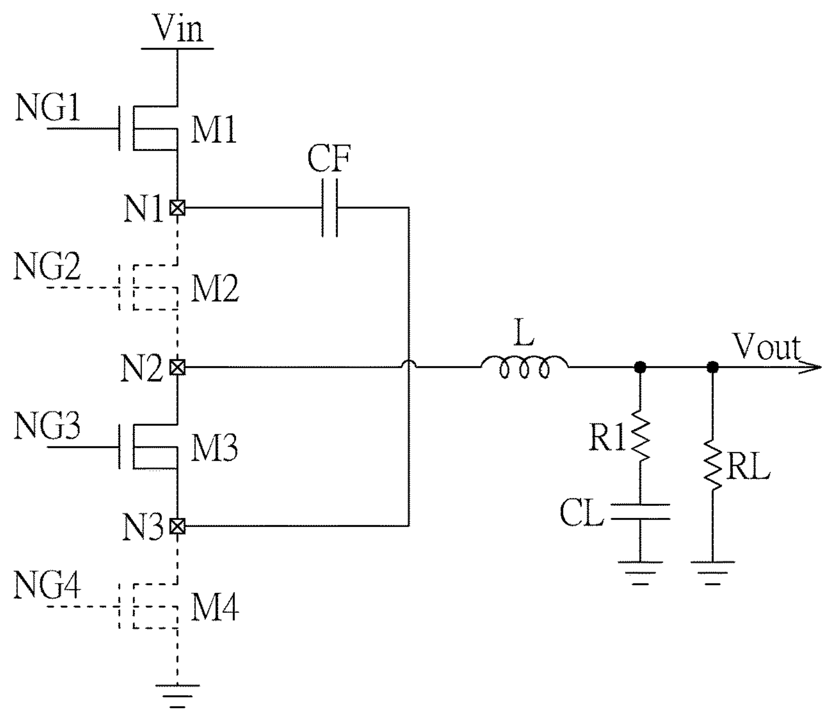
FIGS. 2-5 show states STATE0-STATE3 of the output stage.
Figure 3:
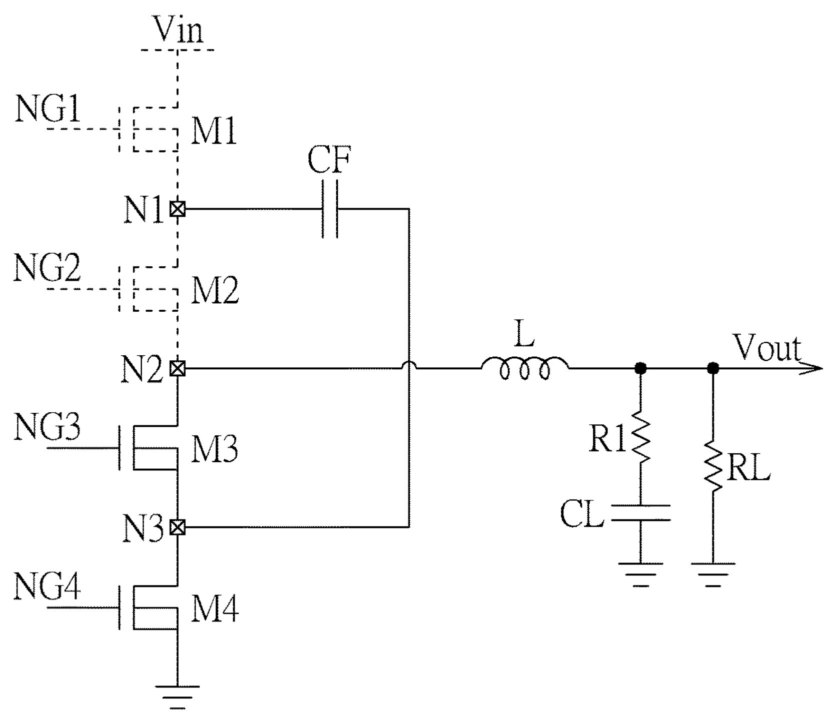
Figure 4:
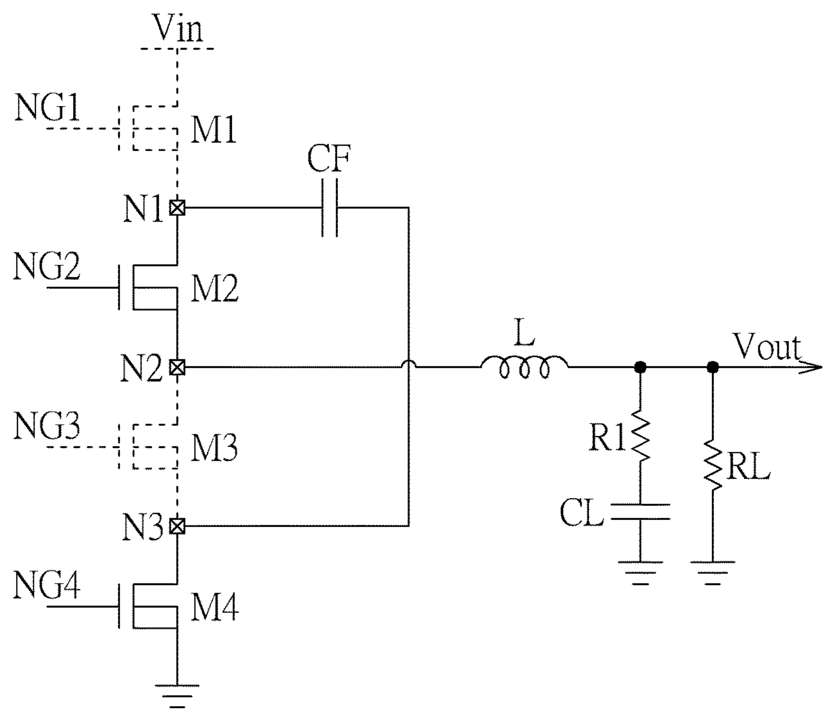
Figure 5:
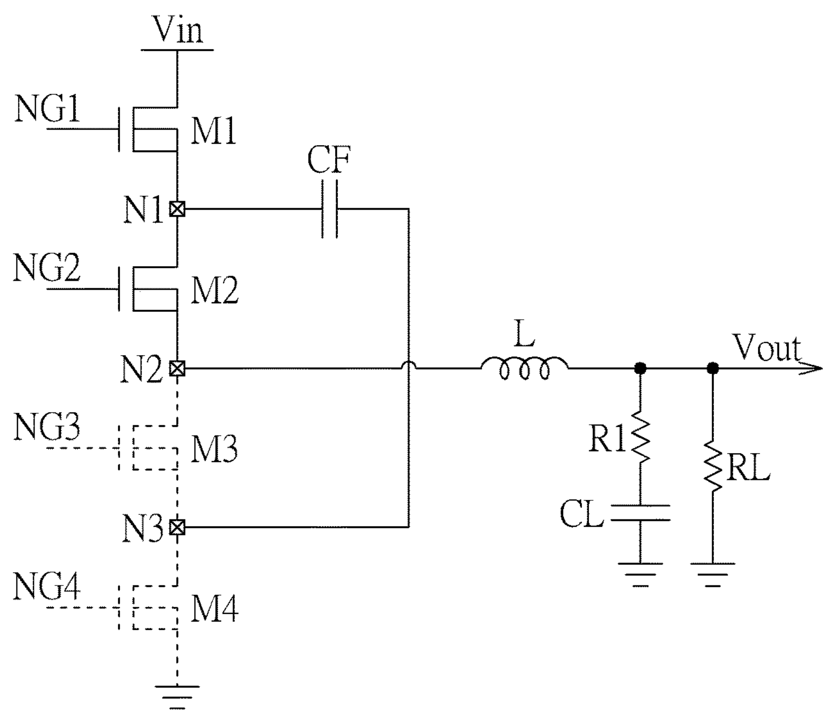

FIGS. 2-5 show states STATE0-STATE3 of the output stage 102. In FIG. 2, the driver 110 generates the driving signals NG1-NG4 to control the switches M1-M4 to operate at charging state (STATE0). Specifically, in the state STATE0, the switches M1 and M3 are conductive while the switches M2 and M4 are non-conductive, that is the flying capacitor CF is charged by the input voltage Vin via the switch M1. In FIG. 3, the driver 110 generates the driving signals NG1-NG4 to control the switches M1-M4 to operate at state STATE1, wherein the switches M3 and M4 are conductive while the switches M1 and M2 are non-conductive. In FIG. 4, the driver 110 generates the driving signals NG1-NG4 to control the switches M1-M4 to operate at discharging state (STATE2), wherein the switches M2 and M4 are conductive while the switches M1 and M3 are non-conductive, that is the flying capacitor CF is discharged via the switch M4. In FIG. 5, the driver 110 generates the driving signals NG1-NG4 to control the switches M1-M4 to operate at state STATE3, wherein the switches M1 and M2 are conductive while the switches M3 and M4 are non-conductive.

Figure 6:
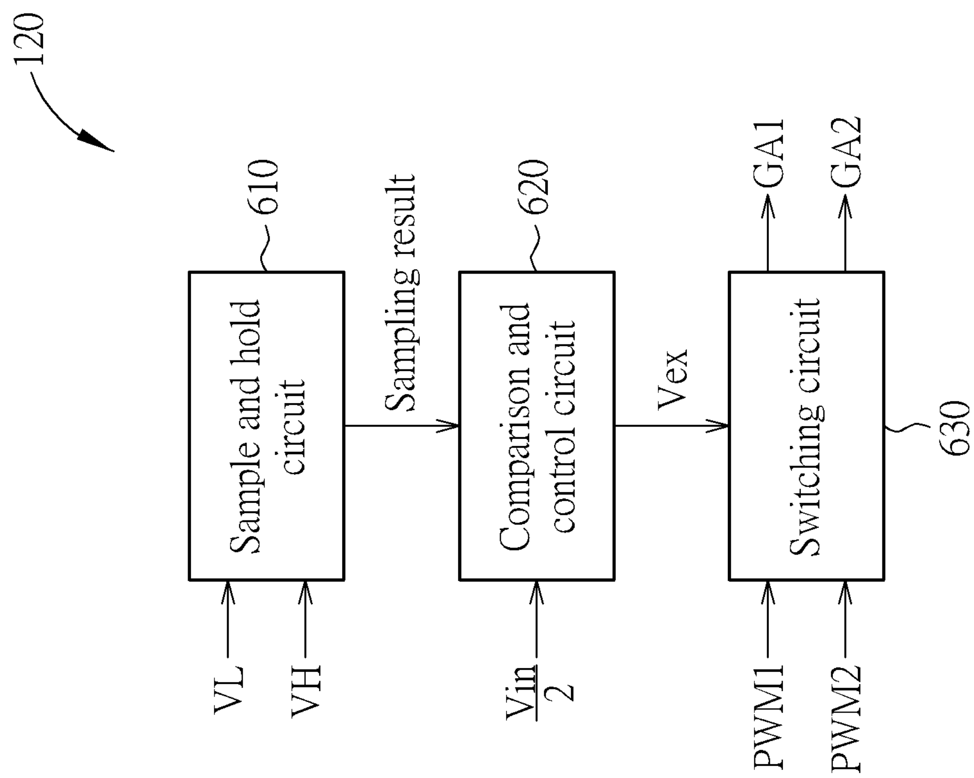
FIG. 6 is a diagram illustrating the FCVB control circuit according to one embodiment of the present invention.

FIG. 6 is a diagram illustrating the FCVB control circuit 120 according to one embodiment of the present invention. As shown in FIG. 6, the FCVB control circuit 120 comprises a sample and hold circuit 610, a comparison and control circuit 620 and a switching circuit 630. During operation of the FCVB control circuit 120, the sample and hold circuit 610 is configured to sample the voltage VL at the state STATE0 or sample the voltage VH at the state STATE2 to generate a sampling result. Specifically, when the driver 110 controls the output stage to operate in the state STATE0 (charging state), the sample and hold circuit 610 samples the voltage VL to generate the sampling result (it is noted that the voltage VH is not sampled here); and when the driver 110 controls the output stage 102 to operate in the state STATE2 (discharging state), the sample and hold circuit 610 samples the voltage VH to generate the sampling result (it is noted that the voltage VL is not sampled here). Then, the comparison and control circuit 620 compares the sampling result with "0.5*Vin" to generate a comparison result, and the comparison and control circuit 620 further generates an exchange signal Vex according to the comparison result. Then, the switching circuit 630 responds to the exchange signal Vex to determine if swapping the received PWM signals. Specifically, if the sampling result is not greater than "0.5*Vin", the switching circuit 630 uses the first PWM signal PWM1 to generate the first control signal GA1, and the switching circuit 630 uses the second PWM signal PWM2 to generate the second control signal GA2 in a next cycle; and in one embodiment, the first control signal GA1 is the first PWM signal PWM1, and the second control signal GA2 is the second PWM signal PWM2. If the sampling result is greater than "0.5*Vin", the switching circuit 630 swapping the internal signals, that is the switching circuit 630 uses the first PWM signal PWM1 to generate the second control signal GA2, and the switching circuit 630 uses the second PWM signal PWM2 to generate the first control signal GA1 in the next cycle; and in one embodiment, the first control signal GA1 is the second PWM signal PWM2, and the second control signal GA2 is the first PWM signal PWM1.

Regarding the FCVB control circuit 120 shown in FIG. 6, when the driver 110 controls the output stage 102 to operate in the state STATE0 (charging state), if the voltage VL is greater than "0.5*VDD", the flying capacitor CF can be regarded as not being charged enough, so the comparison and control circuit 620 generates the exchange signal Vex to the switching circuit 630 so that the output stage 102 still operates at the state STATE0 in the next cycle. In addition, when the driver 110 controls the output stage 102 to operate in the state STATE2 (discharging state), if the voltage VH is greater than "0.5*VDD", the flying capacitor CF can be regarded as not being discharged enough, so the comparison and control circuit 620 generates the exchange signal Vex to the switching circuit 630 so that the output stage 102 still operates at the state STATE0 in the next cycle.

It is noted that the state STATE1/STATE3 may be added between two of the states STATE0/STATE2. For example, if the output stage 102 is controlled to operate in the states STATE0 in two adjacent cycles, the driver 110 may control the output stage 102 to operate in STATE0, STATE1, STATE0 and STATE1 in sequence; if the output stage 102 is controlled to operate in the states STATE2 in two adjacent cycles, the driver 110 may control the output stage 102 to operate in STATE2, STATE1, STATE2 and STATE1 in sequence; and if the output stage 102 is controlled to operate in the states STATE0 and STATE2 in two adjacent cycles, the driver 110 may control the output stage 102 to operate in STATE0, STATE1, STATE2 and STATE1 in sequence. Because the present invention focuses on the charging state and the discharging state, the states STATE1/STATE3 may be omitted in the following descriptions.

It is noted that the FCVB control circuit 120 can control the driver 110 to generate the driving signals NG1-NG4 to change the state of the output stage 102 by swapping the PWM signals PWM1 and PWM2, or by swapping the control signals GA1 and GA2. That is, the state change of the output stage 102 can be easily achieved without re-generating the first PWM signal PWM1 and the second PWM signal PWM2, and the error amplifier 130 and the PWM signal generator 140 can remain its original operation.

Figure 7:
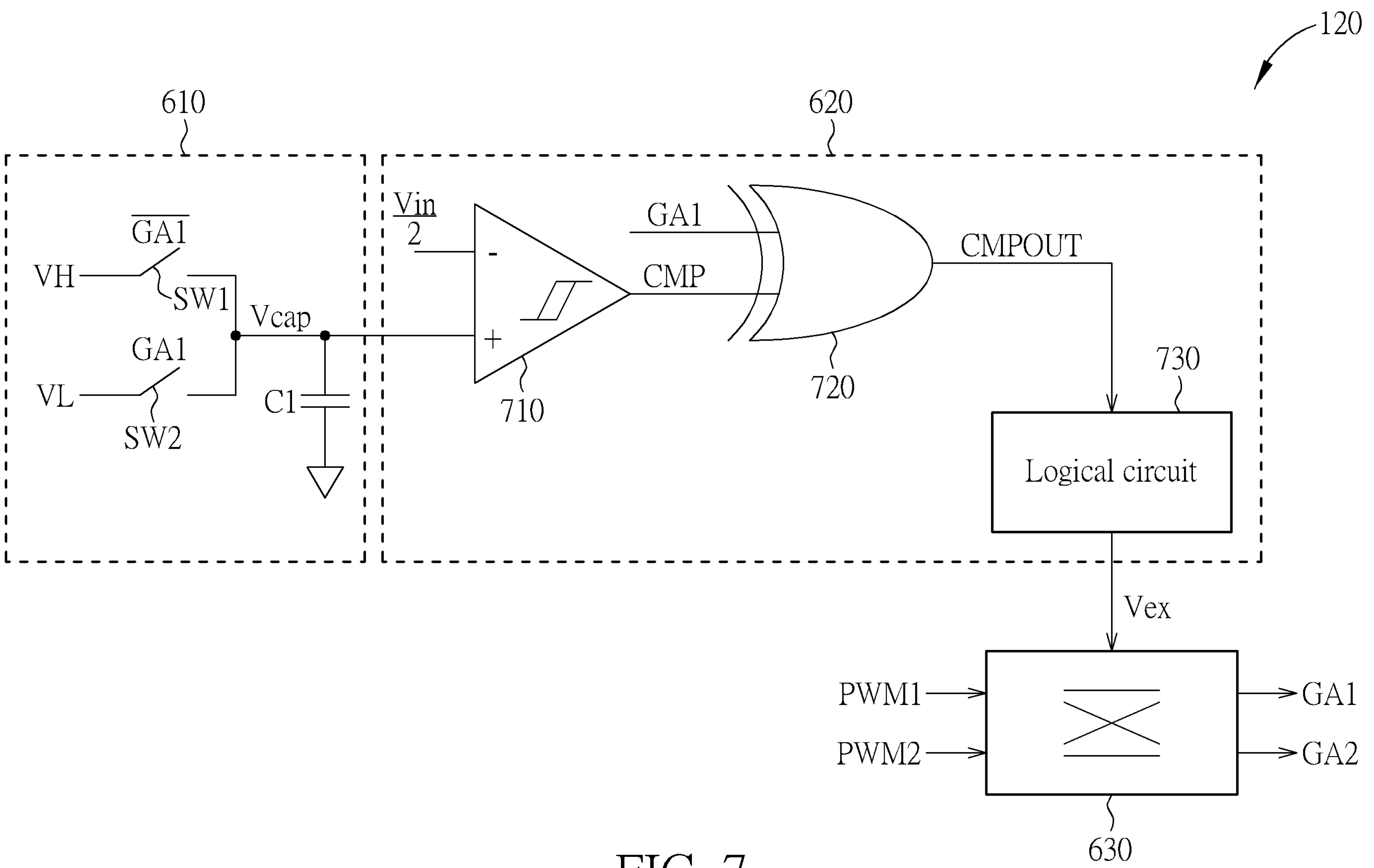
FIG. 7 is a detailed circuit of the FCVB control circuit according to one embodiment of the present invention.

FIG. 7 is a detailed circuit of the FCVB control circuit 120 according to one embodiment of the present invention. As shown in FIG. 7, the sample and hold circuit 610 comprises switches SW1 and SW2 and a capacitor C1; the comparison and control circuit 620 comprises a comparator 710, an XOR gate 720 and a logical circuit 730. Regarding the operation of the sample and hold circuit 610, the switch SW2 is controlled by the first control signal GA1, the switch SW1 is controlled by an inverting signal of the second control signal GA1 (i.e. $\overline{GA1}$), and the voltage Vcap at an upper terminal of the capacitor C1 serves as the sampling result of the sample and hold circuit 610. Regarding the operation of the comparison and control circuit 620, the comparator 710 is configured to compare the sampling result and "0.5*Vin" to generate a comparison result CMP, the XOR gate 720 receives the comparison result CMP and the first control signal GA1 to generate a signal CMPOUT, and the logical circuit 730 generates the exchange signal Vex according to the signal CMPOUT.

Figure 8:
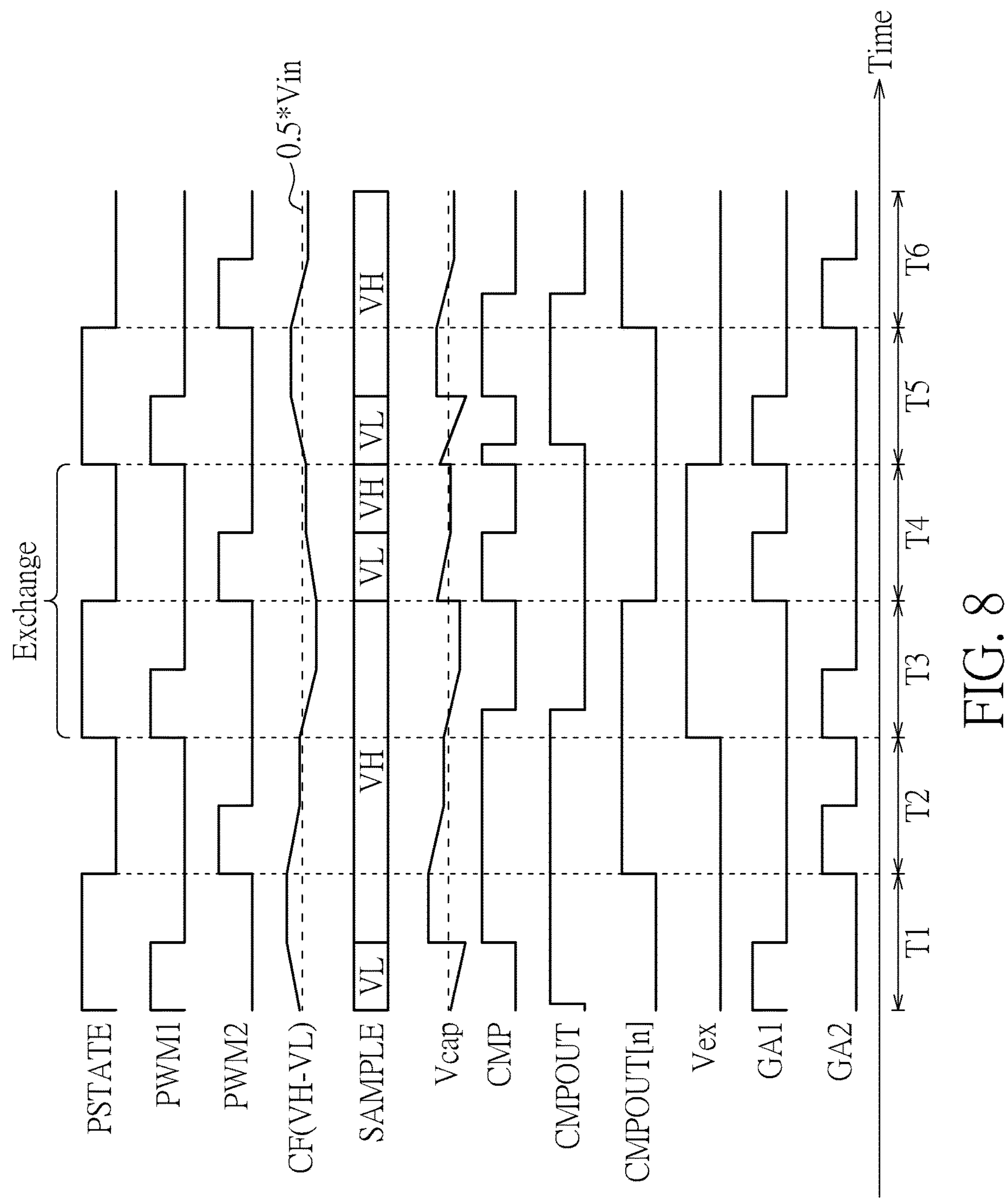
FIG. 8 is a timing diagram of the signals within the FCVB control circuit shown in FIG. 7.

Referring to FIG. 7 and FIG. 8 together, FIG. 8 is a timing diagram of the signals within the FCVB control circuit 120 shown in FIG. 7. In the timing diagram shown in FIG. 8, a signal PSTATE is provided by a control circuit such as the PWM signal generator 140 to indicate which period is arranged for the charging stage (STATE0) and which period is arranged for the discharging state (STATE2) in a default setting. In this embodiment, when the signal PSTATE has a logical value “1”, the output stage 102 can operate at the state STATE0 in the default setting; and when the signal PSTATE has a logical value “0”, the output stage 102 can operate at the state STATE2 in the default setting. In this embodiment, the state of the output stage 102 can be exchanged by using the exchange signal Vex to control the switching circuit 630, that is the actual state of the output stage 102 is not limited by the signal PSTATE.

Specifically, referring to a period T1 shown in FIG. 8, the signal PSTATE has the logical value “1”, and the switching circuit 630 refers to the first PWM signal PWM1 and the second PWM signal PWM2 to generate the first control signal GA1 and the second control signal GA2, respectively (e.g. GA1=PWM1, and GA2=PWM2), and the driver 110 uses the first control signal GA1 and the second control signal GA2 to control the output stage 102 to operate in the state STATE0. At this time, the switch SW2 is conductive, and the voltage VL is sampled to the sampling result Vcap. During the period that the voltage VL is sampled, the sampling result Vcap is always lower than “0.5*Vin”, so the comparison result CMP has the logical value “0”, and the exchange signal Vex having the logical value “0” is generated accordingly, that is the switching circuit 630 does not need to swap the PWM signals PWM1/PWM2 in the next cycle. In addition, a signal CMPOUT[n] shown in FIG. 8 is generated based on the signal CMPOUT to align boundaries of the signal PSTATE, for the internal logical calculation within the logical circuit 730.

Regarding to a period T2 shown in FIG. 8, the signal PSTATE has the logical value “0”, and the switching circuit 630 refers to the first PWM signal PWM1 and the second PWM signal PWM2 to generate the first control signal GA1 and the second control signal GA2, respectively (e.g. GA1=PWM1, and GA2=PWM2), and the driver 110 uses the first control signal GA1 and the second control signal GA2 to control the output stage 102 to operate in the state STATE2. At this time, the switch SW1 is conductive, and the voltage VH is sampled to the sampling result Vcap. During the period that the voltage VH is sampled, the sampling result Vcap is greater than “0.5*Vin”, the next cycle should be still in the state STATE2. Because the default state of the output stage 102 is the state STATE0, the logical circuit 730 generates the exchange signal Vex having the logical value “1” in the next cycle, that is the switching circuit 630 needs to swap the PWM signals PWM1/PWM2 in the next cycle.

Regarding to a period T3 shown in FIG. 8, the signal PSTATE has the logical value “1”, but because the comparison result CMP has the logical value “1” in the period T2, the comparison and control circuit 620 generates the exchange signal Vex having the logical value “1” to control the switching circuit 630 to have the swapping mechanism, the switching circuit 630 refers to the first PWM signal PWM1 to generate the second control signal GA2, and the switching circuit 630 refers to the second PWM signal PWM2 to generate the first control signal GA1 (e.g. GA1=PWM2, and GA2=PWM1), and the driver 110 uses the first control signal GA1 and the second control signal GA2 to control the output stage 102 to operate in the state STATE2. At this time, the switch SW1 is conductive, and the voltage VH is sampled to generate the sampling result Vcap. During the period that the voltage VH is sampled, the sampling result Vcap is not greater than “0.5*Vin” in the period T3, so the comparison result CMP has the logical value “0”, that is the next cycle should be operate in the state STATE0. Because the default state of the output stage 102 is the state STATE2, the logical circuit 730 generates the exchange signal Vex having the logical value “1”, that is the switching circuit 630 needs to swap the PWM signals PWM1/PWM2 in the next cycle.

Regarding to a period T4 shown in FIG. 8, the signal PSTATE has the logical value “0”, but because the comparison result CMP has the logical value “0” in the period T3, the comparison and control circuit 620 generates the exchange signal Vex having the logical value “1” to control the switching circuit 630 to have the swapping mechanism, the switching circuit 630 refers to the first PWM signal PWM1 to generate the second control signal GA2, and the switching circuit 630 refers to the second PWM signal PWM2 to generate the first control signal GA1 (e.g. GA1=PWM2, and GA2=PWM1), and the driver 110 uses the first control signal GA1 and the second control signal GA2 to control the output stage 102 to operate in the state STATE0. At this time, the switch SW2 is conductive, and the voltage VL is sampled to generate the sampling result Vcap. During the period that the voltage VL is sampled, the sampling result Vcap is greater than “0.5*Vin” in the period T4, so the comparison result CMP has the logical value “1”, that is the next cycle should be operate in the state STATE0. Because the default state of the output stage 102 is also the state STATE0, the logical circuit 730 generates the exchange signal Vex having the logical value “0”, that is the switching circuit 630 does not need to swap the PWM signals PWM1/PWM2 in the next cycle.

Regarding to a period T5 shown in FIG. 8, the signal PSTATE has the logical value “1”, and the switching circuit 630 refers to the first PWM signal PWM1 and the second PWM signal PWM2 to generate the first control signal GA1 and the second control signal GA2, respectively (e.g. GA1=PWM1, and GA2=PWM2), and the driver 110 uses the first control signal GA1 and the second control signal GA2 to control the output stage 102 to operate in the state STATE2. At this time, the switch SW1 is conductive, and the voltage VL is sampled to the sampling result Vcap. During the period that the voltage VH is sampled, the sampling result Vcap is not greater than “0.5*Vin” at the beginning, the next cycle should operate in the state STATE2. Because the default state of the output stage 102 is the state STATE2, the logical circuit 730 generates the exchange signal Vex having the logical value “0”, that is the switching circuit 630 does not need to swap the PWM signals PWM1/PWM2 in the next cycle.

In light of above, the output stage 102 can always operate in the appropriate state by simply using the FCVB control circuit 120, and the PWM signal generator 140 can have its original operation. In addition, the FCVB control circuit 120 is digital-like circuit with low power dissipation.

In the embodiment shown in FIGS. 7 and 8, the exchange signal Vex can be simply obtained by considering the signal PSTATE and the signal CMPOUT[n]. For example, if the signal PSTATE has the logical value “1” and the signal CMPOUT[n] has the logical value “1”, the exchange signal Vex is enabled to have the logical value “1”; and if the signal PSTATE has the logical value “0” and the signal CMPOUT

[n] has the logical value "0", the exchange signal Vex is also enabled to have the logical value "1"; otherwise, the exchange signal Vex has the logical value "0". However, the above logical calculation is not a limitation of the present invention. As long as the exchange signal Vex is determined based on the sampling result generated by sampling the voltage VH at the state STATE0 or by sampling the voltage VL at the state STATE2, the comparison and control circuit 620 can have any suitable logical circuit design.

It is noted that the FCVB control circuit 120 shown in FIG. 7 and the timing diagram shown in FIG. 8 are for illustrative purposes only. As long as the FCVB control circuit 120 samples the voltage VL at the state STATE0 and the FCVB control circuit 120 samples the voltage VH at the state STATE2 to generate the sampling result to determine if swapping the PWM signals PWM1/PWM2 to make the output stage 102 have the appropriate state in the next cycle, the FCVB control circuit 120 may have different circuit design.

Figure 9:
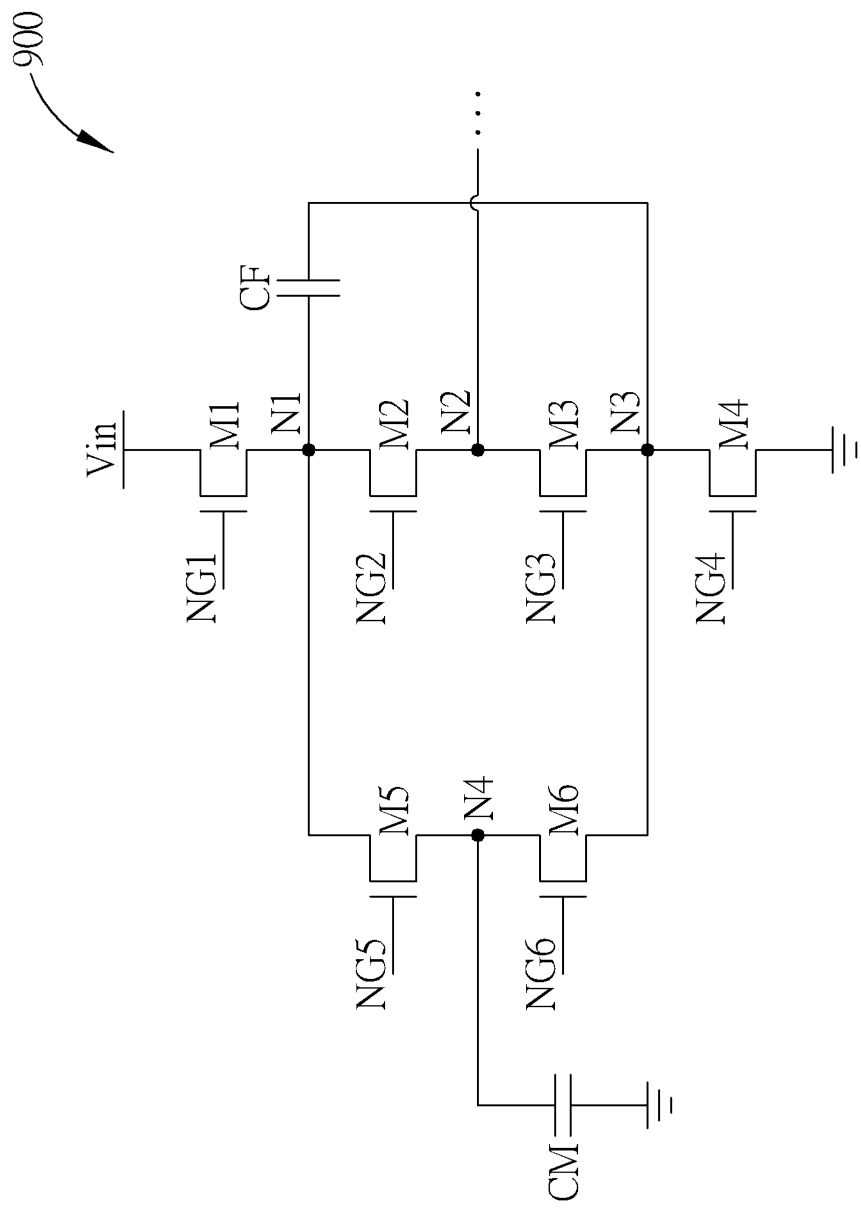
FIG. 9 shows an output stage according to another embodiment of the present invention.

In addition, the output stage 102 shown in FIG. 1 may be replaced by an output stage 900 shown in FIG. 9. As shown in FIG. 9, compared with the output stage 102, the output stage 900 further comprises a switch M5, a switch M6 and a capacitor CM, wherein the switch M5 is coupled between the nodes N1 and N4, the switch M6 is coupled between the nodes N3 and N4, and the capacitor CM is coupled between the node N4 and the ground voltage. In addition, the driver 110 further generates the driving signals NG5 and NG6 to control the switches M5 and M6, respectively.

In addition, the control mechanism of the FCVB control circuit 120 may be implemented by a 5-level buck converter. For example, the output stage of the 5-level buck converter may have eight switches connected in series.

Briefly summarized, in the buck converter of the present invention, by using the bang-bang FCVB control circuit to sense the voltage of the flying capacitor to swap the PWM signals, the output stage can operate in the appropriate state without changing the original control steps. Therefore, the buck converter can use a simple design to efficiently balance the voltage of the flying capacitor.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A buck converter, comprising:

an output stage comprising a plurality of switches and a flying capacitor, wherein the switches are connected in series, the flying capacitor is coupled between two of the switches, and the output stage is configured to receive an input voltage to generate an output voltage;

a flying capacitor voltage balance (FCVB) control circuit, configured to compare a voltage of the flying capacitor with half of the input voltage to generate a comparison result, and the FCVB control circuit further responds to the comparison result to generate a first control signal and a second control signal based on a first pulse-width modulation (PWM) signal and a second PWM signal; and a driver, coupled to the FCVB control circuit and the output stage, configured to generate a plurality of diving signals according to the first control signal and the second control signal, wherein the driving signals are arranged to control the switches, respectively;

wherein the output stage is controlled by the driving signals to selectively operate in a charging state or a discharging state; when the output stage operates in the charging state, the FCVB control circuit compares a first voltage of a first terminal of the flying capacitor with half of the input voltage to generate the comparison result and when the output stage operates in the discharging state, the FCVB control circuit compares a second voltage of a second terminal of the flying capacitor with half of the input voltage to generate the comparison result.

2. The buck converter of claim 1, wherein the when the output stage operates in the charging state, the FCVB control circuit compares the first voltage of the first terminal of the flying capacitor with half of the input voltage to generate the comparison result; and if the comparison indicates that the first voltage is not greater than half of the input voltage, the FCVB control circuits uses the first PWM signal to generate the first control signal, and the FCVB control circuits uses the second PWM signal to generate the second control signal in a next cycle; and if the comparison indicates that the first voltage is greater than half of the input voltage, the FCVB control circuits uses the second PWM signal to generate the first control signal, and the FCVB control circuits uses the first PWM signal to generate the second control signal in the next cycle.

3. The buck converter of claim 2, wherein if the comparison indicates that the first voltage is not greater than half of the input voltage, the FCVB control circuits generates the first control signal and the second control signal to the driver to generate the driving signals to control the output stage to operate in the discharging state in the next cycle; if the comparison indicates that the first voltage is greater than half of the input voltage, the FCVB control circuits generates the first control signal and the second control signal to the driver to generate the driving signals to control the output stage to operate in the charging state in the next cycle.

4. The buck converter of claim 1, wherein the when the output stage operates in the discharging state, the FCVB control circuit compares the second voltage of the second terminal of the flying capacitor with half of the input voltage to generate the comparison result; and if the comparison indicates that the second voltage is not greater than half of the input voltage, the FCVB control circuits uses the first PWM signal to generate the first control signal, and the FCVB control circuits uses the second PWM signal to generate the second control signal in a next cycle; and if the comparison indicates that the second voltage is greater than half of the input voltage, the FCVB control circuits uses the second PWM signal to generate the first control signal, and the FCVB control circuits uses the first PWM signal to generate the second control signal in the next cycle.

5. The buck converter of claim 4, wherein if the comparison indicates that the second voltage is not greater than half of the input voltage, the FCVB control circuits generates the first control signal and the second control signal to the driver to generate the driving signals to control the output stage to operate in the charging state in the next cycle; if the comparison indicates that the second voltage is greater than half of the input voltage, the FCVB control circuits generates the first control signal and the second control signal to the driver to generate the driving signals to control the output stage to operate in the discharging state in the next cycle.

6. The buck converter of claim 1, wherein the output circuit comprises:

a first switch, coupled between the input voltage and a first node;

a second switch, coupled between the first node a second node;

a third switch, coupled between the second node and a third node;

a fourth switch, coupled between the third node and a reference voltage;

wherein the first terminal of the flying capacitor is coupled to the first node, and the second terminal of the flying capacitor is coupled to the third node.

7. The buck converter of claim 6, wherein when the output stage operates in the charging state, the first switch and the third switch are conductive, and the second switch and the fourth switch are non-conductive; and when the output stage operates in the discharging state, the second switch and the fourth switch are conductive, and the first switch and the third switch are non-conductive.

8. A control method of a buck converter, wherein the buck converter comprises an output stage, the output stage comprises a plurality of switches and a flying capacitor, the switches are connected in series, the flying capacitor is coupled between two of the switches, and the output stage is configured to receive an input voltage to generate an output voltage; and the control method comprises the steps of:

comparing a voltage of the flying capacitor with half of the input voltage to generate a comparison result;

referring to the comparison result to generate a first control signal and a second control signal based on a first pulse-width modulation (PWM) signal and a second PWM signal; and generating a plurality of diving signals according to the first control signal and the second control signal to control the switches, respectively;

wherein the output stage is controlled by the driving signals to selectively operate in a charging state or a discharging state; and the step of comparing the voltage of the flying capacitor with half of the input voltage to generate the comparison result comprises:

when the output stage operates in the charging state, comparing a first voltage of a first terminal of the flying capacitor with half of the input voltage to generate the comparison result; and when the output stage operates in the discharging state, comparing a second voltage of a second terminal of the flying capacitor with half of the input voltage to generate the comparison result.

9. The control method of claim 8, wherein the step of referring to the comparison result to generate the first control signal and the second control signal based on the first PWM signal and the second PWM signal comprises:

if the comparison indicates that the first voltage is not greater than half of the input voltage, using the first PWM signal to generate the first control signal, and using the second PWM signal to generate the second control signal in a next cycle; and if the comparison indicates that the first voltage is greater than half of the input voltage, using the second PWM signal to generate the first control signal, and using the first PWM signal to generate the second control signal in the next cycle.

10. The control method of claim 9, wherein the step of generating the diving signals according to the first control signal and the second control signal to control the switches, respectively, comprises:

when the output stage operates in the charging mode, if the comparison indicates that the first voltage is not greater than half of the input voltage, generating the driving signals to control the output stage to operate in the discharging state in the next cycle; and when the output stage operates in the charging mode, if the comparison indicates that the first voltage is greater than half of the input voltage, generating the driving signals to control the output stage to operate in the charging state in the next cycle.

11. The control method of claim 8, wherein the step of referring to the comparison result to generate the first control signal and the second control signal based on the first PWM signal and the second PWM signal comprises:

if the comparison indicates that the second voltage is not greater than half of the input voltage, using the first PWM signal to generate the first control signal, and using the second PWM signal to generate the second control signal in a next cycle; and if the comparison indicates that the second voltage is greater than half of the input voltage, using the second PWM signal to generate the first control signal, and using the first PWM signal to generate the second control signal in the next cycle.

12. The control method of claim 11, wherein the step of generating the diving signals according to the first control signal and the second control signal to control the switches, respectively, comprises:

when the output stage operates in the discharging state, if the comparison indicates that the second voltage is not greater than half of the input voltage, generating the driving signals to control the output stage to operate in the charging state in the next cycle; and if the comparison indicates that the second voltage is greater than half of the input voltage, generating the driving signals to control the output stage to operate in the discharging state in the next cycle.

* * * * *